United States Patent [19]
Castaldo, Jr.

[11] Patent Number: 6,148,278
[45] Date of Patent: Nov. 14, 2000

[54] EMULATING THE S/390 READ BACKWARDS TAPE OPERATION ON SCSI ATTACHED TAPE DEVICES

[75] Inventor: Carmine Castaldo, Jr., New Paltz, N.Y.

[73] Assignee: International Business Machines Corporation, Armonk, N.Y.

[21] Appl. No.: 09/159,677

[22] Filed: Sep. 24, 1998

[51] Int. Cl.[7] ........................................ G06F 9/455
[52] U.S. Cl. ................... 703/26; 703/24; 703/25; 703/27
[58] Field of Search .................. 703/26, 24, 23, 703/27, 25

[56] References Cited

U.S. PATENT DOCUMENTS

| | | |
|---|---|---|
| 3,947,876 | 3/1976 | Gary . |
| 5,303,349 | 4/1994 | Warrnier et al. .................. 395/500.45 |
| 5,454,098 | 9/1995 | Pisello et al. ..................... 395/500.45 |
| 5,455,926 | 10/1995 | Keele et al. ................................. 711/4 |
| 5,590,313 | 12/1996 | Reynolds et al. .................. 395/500.47 |
| 5,640,541 | 6/1997 | Bartram et al. .................... 395/500.47 |

OTHER PUBLICATIONS

Magstar 3590 (Magstar 3590 Tape Subsystem: Multiplatform Implementation, Chapter 3, Sections 3.1 –3.2.4, Nov. 1997 [retrieved from the Internet on Jan. 31, 2000]. Retrieved from the Internet at http://www.redbooks.ibm-.com/SG242594/sg242008.htm).

Magstar 3590 Table of Contents (Magstar 3590 Tape Subsystem: Multiplatform Implementation, Table of Contents, Nov. 1997 [retrieved from the Internet on Jan. 31, 2000]. Retrieved from the Internet at http://www.redbooks.ibm-.com/SG2425994/sg24254.htm.

*Primary Examiner*—Kevin J. Teska
*Assistant Examiner*—Douglas W. Sergent
*Attorney, Agent, or Firm*—Venable; Laurence J. Marhoefer; Lynn L. Augspurger

[57] ABSTRACT

Disclosed is a method for attaching SCSI tape devices which may only read in a forward direction to an S/390 compatible computer system. This involves translating S/390 I/O operations for channel communication by emulating an S/390 "Read Backwards" channel command with a single "Read Backwards" routine to be used for all SCSI tape drives regardless of read capabilities in the backward direction. The emulation of a S/390 "Read Backwards" channel command includes using a combination of existing tape positioning commands, including: the RF (Read Forward) command, parsing technique to obtain the appropriate bytes to be stored into memory, and calculation for the residual byte count.

5 Claims, No Drawings

EMULATING THE S/390 READ BACKWARDS TAPE OPERATION ON SCSI ATTACHED TAPE DEVICES

FIELD OF THE INVENTION

This invention relates to computer tape driver operations and particularly to a method for attaching SCSI compatible tape drives to S/390 machines and those which recognize S/390 I/O controls.

Trademarks: S/390 and IBM are registered trademarks of International Business Machines Corporation, Armonk, New York, U.S.A.. Other names may be registered trademarks or product names of International Business Machines Corporation or other companies.

BACKGROUND

For many years computer tape drives have had heads and circuits which allow tapes to be read backwards as well as forwards, as illustrated by U.S. Pat. No. 3,947,876 entitled "Dual Density 800 bpi NRZI and 1600 bpi PE Read Circuit for a Digital Magnetic Tape Transport," by Martin D. Gray. Mr. Gray's patent (C. J. Kennedy Company) provides that when reading tape backwards in a phase encoded format, high to low flux transitions, which create a negative peak on the read head signal for a one bit in the forward direction, appear as low to high flux transitions and create a positive peak at a one bit when reading tape in the reverse direction. This inversion of the read head signal also causes the differentiated read head signal to be inverted. For this reason, a phase encode reverse signal, PE-RVS, drives a second input exclusive OR to reinvert the squared, differentiated read head signal so that at the output of exclusive gate the squared, differentiated read head signal always has the same polarity with a low to high transition representing a one and a high to low transition representing a zero. It thus becomes possible for the same circuitry to process the squared, differentiated read head signal to detect binary zeros and ones regardless of tape direction.

While this patent described above a particular arrangement of a read circuit for a digital magnetic tape transport, there have been many others. A problem is that tape drives may not work in a particular environment, and some tape drives are able to read, in spite of the teaching of the art, only in a forward direction. The particular problem addressed here is how to make any SCSI tape drive such as a 9-track cartridge and like SCSI attached tape drives function with the IBM S/390 product "IBM RS/6000 and System/390 Server-on-board" regardless of the drive used. A solution to the problem needs to address the fact that many SCSI attached tape drives can read only in a forward direction.

SUMMARY OF THE INVENTION

S/390 products that support SCSI attached tape devices (such as the P/390 based products) in accordance with this invention translating all S/390 I/O operations to the equivalent SCSI operation. This invention solves the problem of translating all S/390/ I/O operations in a way that makes it possible to port and maintain the code.

In accordance with the invention, emulating an S/390 "Read Backwards" channel command for a SCSI attached tape drive that can read only in a forward direction by the function described is obtained by a function that allows a single "Read Backwards" routine to be used for all SCSI tape drives regardless of read capabilities in the backward direction.

The advantages are:
  Better portability and maintainability of code
  Larger support base of SCSI tape drives
  More options for the customer.

DETAILED DESCRIPTION OF THE INVENTION

In accordance with the invention, a method which can be implemented by a program driver installed in S/390 products that support SCSI attached tape devices (such as the P/390-based products) translates all S/390 I/O operations to the equivalent SCSI operation enabling the drive to be attached to S/390 machines and machines which recognize S/390 channel operations such that all S/390/ I/O operations are translated in a way that makes it possible to port and maintain the code.

In accordance with the invention emulating an S/390 "Read Backwards " channel command for a SCSI attached tape drive that can read only in a forward direction is obtained by a function that allows a single "Read Backwards" routine to be used for all SCSI tape drives regardless of read capabilities in the backward direction.

The method which is employed emulates the RB (Read Backwards) operation using a combination of existing tape positioning commands: the RF (Read Forward) command, a parsing technique to obtain the appropriate bytes to be stored into memory and a calculation for the residual byte count.

When one of ordinary skill follows the attached table illustrating the particular method used in pseudo code of the Table 1 code set forth below, the result of the method will be appreciated. From the following code, it will be seen that, first, a BSB (Back Space Block) request is made, followed by a RF (Read Forward) request for the maximum possible record size (64 K - 1) into a temporary buffer, followed by another BSB. These actions will position the tape correctly and read the entire requested data record, in the forward direction, into a buffer. However, for a real RB (Read Backwards) operation on magnetic tape drives, data is read from the end of the record in the reverse direction and stored into memory in a descending order of addresses, starting with the specified address in the CCW (Channel Command Word). This requires that the end of the data is located in the temporary buffer and that the correct amount of data is parsed to be stored into memory in the reverse direction. Finally, the residual byte count must be calculated for the ending status.

TABLE 1

(Pseudo Code Implementation of the Method)

```
/* Global Variables   */
TempBufferAddr       /* pointer to the start of a temporary 64K
                        buffer in the host I/O processor memory */
SCSIResidualCount    /* Set by the RF function. Equals number of
                        bytes requested minus number of bytes read */
CCWRequestCount      /* This is the requested count from the Read
                        Backward CCW */
CCWDataAddr          /* This is the target S/390 memory address
                        from the Read Backward CCW */
SUCCESS              /* a successful return code form RF or BSB */
/* Functions called   */
BSB                  /* Back Space Block routine -
    BSB (number_of_blocks_to_space) */
RF                   /* Read Forward - RF(number_of_bytes_to_read,
                        target_buffer_address) */
STORE_MEM            /* Store into S/390 memory from buffer -
                        STOR_MEM(source_buffer_address, length,
                        target_390_memory_location) */
```

TABLE 1-continued (Pseudo Code Implementation of the Method)

```
REPORT_STATUS   /* Report status
                   REPORT_STATUS(residual_byte_count) */
MINIMUM         /* return the lesser of 2 values -
                   MINIMUM(value1, value2)      */
MAXIMUM         /* return the greater of 2 values -
                   MAXIMUM(value1, value2)      */
FUNCTION ReadBackwards:
if (call BSB(1) == SUCCESS)
                /* Back Space 1 Block (record) to position
                   tape for read forward */
  do
                /* Success... */
      if (call RF((64K - 1),TempBufferAddr) == SUCCESS)
                /* Read Forward 64K-1 Bytes (max block size)
                   into temporary buffer */
        do
          /* Success... *
          RecordLength = (64K -1) - SCSIResidualCount
                /* calculate size of record read. SCSI drive
                   returns residual count */
          DataLngToMove = MINIMUM (RecordLength,
          CCWRequestCount)
                /* calculate no of bytes to move into memory,
                   cant exceed record lng */
          Offset = MAXIMUM( (RecordLength - CCWRequestCount),0)
                /* calculate start of data. Must be a
                   positive offset or 0 */
          EndResidualCount = MAXIMUM( (CCWRequestCount -
RecordLength), 0 ) /* calculate the residual byte count to be
                   stored with ending status */
          MemStartAddr = CCWDataAddr - DataLngToMove +1
                /* calculate start address in memory for a
                   forward transfer */
          STORE_MEM( (TempBufferAddr + Offset), DataLngToMove,
MemStartAddr)   /* Move data from buffer to memory for length
                   calculated */
        endif
      BSB(1)    /* position tape back to beginning of record */
      REPORT_STATUS (EndResidualCount)
endif
```

(Note: CCW flag checks, address validation, and other standard checks are not shown.)

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for attaching SCSI tape devices which can only read in a forward direction to an S/390 compatible computer system, comprising the steps of:

translating S/390 operations for channel communication by emulating an S/390 "Read Backwards" channel command with a single "Read Backwards" routine capable of operating SCSI tape drives that read only in the forward direction and SCSI tape drives that read in the forward direction and in the backward direction.

2. A method for attaching SCSI tape devices according to claim 1 wherein the emulation of said S/390 "Read Backwards" channel command includes using a combination of existing tape positioning commands, including: the RF (Read Forward) command, parsing technique to obtain the appropriate bytes to be stored into memory, and calculation for the residual byte count.

3. A method for attaching SCSI tape devices according to claim 1 wherein the following steps are employed:

(a) a BSB (Back Space Block) request is made, and subsequently, (b) a RF (Read Forward) request for the maximum possible record size (64K - 1) into a temporary buffer is made, and subsequently, (c) a BSB (Back Space Block) request is made, and after steps (a)–(c) have positioned a tape being read correctly, subsequently, data of the tape will be read as an entire requested data record, in the forward direction, into a buffer.

4. A method for attaching SCSI tape devices according to claim 1 wherein the following steps are employed:

(a) for a RB (Read Backwards) operation on magnetic tape drives, data is read from the end of the record in the reverse direction and stored into memory in a descending order of addresses, starting with a specified address in a CCW (Channel Command Word); and wherein, (b) at the end of data read from the end of the record in the reverse direction and stored into memory in a descending order of addresses, starting with a specified address in a CCW (Channel Command Word), the data is located in the temporary buffer, and an amount of data is parsed to be stored into memory in the reverse direction; and (c) finally, a residual byte count is calculated for the ending status.

5. A method for attaching SCSI tape devices according to claim 1 wherein the following steps are employed:

(a) a BSB (Back Space Block) request is made, and subsequently, (b) a RF (Read Forward) request for the maximum possible record size (64K - 1) into a temporary buffer is made, and subsequently, (c) a BSB (Back Space Block) request is made, and after steps (a)–(c) have positioned a tape being read correctly, subsequently, data of the tape will be read as an entire requested data record, in the forward direction, into a buffer; and (d) for a RB (Read Backwards) operation on magnetic tape drives, data is read from the end of the record in the is reverse direction and stored into memory in a descending order of addresses, starting with a specified address in a CCW (Channel Command Word); and wherein, (e) at the end of data read from the end of the record in the reverse direction and stored into memory in a descending order of addresses, starting with a specified address in a CCW (Channel Command Word), the data is located in the temporary buffer, and an amount of data is parsed to be stored into memory in the reverse direction; and (f) finally, a residual byte count is calculated for the ending status.

* * * * *